(12) United States Patent
Miura

(10) Patent No.: US 6,333,934 B1
(45) Date of Patent: Dec. 25, 2001

(54) CDMA RECEIVING APPARATUS

(75) Inventor: Tetsuya Miura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/148,313

(22) Filed: Sep. 4, 1998

(30) Foreign Application Priority Data

Sep. 4, 1997 (JP) .................................................. 9-239391

(51) Int. Cl.[7] .................................................. H04B 7/216
(52) U.S. Cl. ........................ 370/441; 370/335; 375/142
(58) Field of Search .................................. 370/441, 479, 370/208, 209, 320, 335, 342, 203–207, 503, 514–519; 375/136, 137, 147, 149, 150, 140, 141, 142, 145

(56) References Cited

U.S. PATENT DOCUMENTS

| | | | |
|---|---|---|---|
| 5,594,755 | * 1/1997 | Hulbert | 375/208 |
| 5,737,326 | * 4/1998 | I et al. | 370/335 |
| 5,805,585 | * 9/1998 | Javitt et al. | 370/342 |
| 5,881,056 | * 3/1999 | Huang et al. | 370/335 |
| 5,982,763 | * 11/1999 | Sato | 370/342 |
| 6,005,887 | * 12/1999 | Bottomley et al. | 375/207 |
| 6,026,115 | * 2/2000 | Higashi et al. | 375/200 |
| 6,067,293 | * 5/2000 | Shoji | 370/342 |

FOREIGN PATENT DOCUMENTS 8-186558 7/1996 (JP) .
8-256084 10/1996 (JP) .

* cited by examiner

Primary Examiner—Alpus H. Hsu
Assistant Examiner—Brian Nguyen
(74) Attorney, Agent, or Firm—McGinn & Gibb, PLLC

(57) ABSTRACT

A CDMA receiving apparatus which can accurately perform phase tracking for a reception signal even under an environment wherein the reception delay amount varies in a period shorter than the processing time of a synchronization detection and phase tracking section. The CDMA receiving apparatus includes a plurality of FINGER processing sections individually provided for a plurality of paths and including de-spreading sections for receiving a signal spread with a spread code and arriving through the paths and de-spreading the reception signal with a de-spread code and channel estimation sections for estimating the paths based on results of the processing of the de-spreading sections, and a synchronization detection and phase tracking section for outputting a reception delay amount of the reception signal in a predetermined period to the de-spreading sections. Each de-spreading section includes a plurality of correlators for individually correcting, when the reception delay amounts are received, the reception delay amounts and performing de-spreading processing. Each channel estimation section includes level measurement sections for individually measuring correction value levels of the correlators, a level comparison section for comparing the measurement levels, and a path change-over section for selecting the correlation magnitude of that one of the correlators which is detected to output the highest measurement level.

19 Claims, 11 Drawing Sheets

CDMA RECEIVING APPARATUS

BACKGROUND OF THE INVENTION

1. Field of the Invention

The present invention relates to a CDMA (Code Division Multiplex Access) receiving apparatus for use with a mobile radio communication system of the CDMA type.

2. Description of the Related Art

A CDMA receiving apparatus for use with a mobile radio communication system for a portable telephone set or the like of the CDMA type conventionally has a general construction as shown in FIG. 8. Referring to FIG. 8, the CDMA receiving apparatus shown includes a plurality of FINGER processing sections 1 (FINGER processing sections $1_1$ to $1_n$) a RAKE composition section 2, a decoding section 3 which performs decoding processing including error correction of a reception signal after detection, and a synchronization detection and phase tracking section 4. In FIG. 8, reference symbol A denotes a reception signal before de-spreading, B a delay amount indication signal indicating a timing of de-spreading detected and instructed by the synchronization detection and phase tracking section 4, and C a reception signal after detection. In the receiving apparatus shown in FIG. 8, in order to process each reception signal A of a plurality of paths (that is, multi-paths), the plural number of FINGER processing sections $1_1$ to $1_n$ are provided corresponding to the paths. The term "FINGER" of the FINGER processing sections signifies a signal like a finger, and such processing sections are called FINGER processing sections since they process the reception signal A which is a finger-like signal. Meanwhile, the RAKE composition section processes signals outputted from the FINGER processing sections like a rake.

FIG. 9 shows a block diagram of a construction of the FINGER processing sections $1_1$ to $1_n$ in the CDMA receiving apparatus. Referring to FIG. 9, the FINGER processing section 1 shown includes a de-spreading section 5 and a channel estimation section 6. The de-spreading section 5 includes correlators 8 ($8_1$ to $8_3$). A correlation magnitude D is outputted from each of the correlators 8 of the de-spreading section 5 to de channel estimation section 6. The channel estimation section 6 includes a channel estimator 12, and a detection section 13 which interpolates symbol positions of the reception signal A based on an estimate channel vector obtained by the channel estimator 12.

A reception signal A is a modulated signal whose signal spectrum is spread by a spread code when it is transmitted from the transmission side. Consequently, upon reception of the reception signal A, the synchronization detection and phase tracking section 4 modulates the reception signal A by successively displacing the phase of a de-spread code (same code as the spread code but inverse in polarity) to determine correlation magnitudes. Then, those of the correlation magnitudes which are higher than a threshold value designated in advance are determined, and each phase of the de-spread code corresponding to the determined correlation magnitudes is indicated to the de-spreading sections 5 of the FINGER processing sections $1_1$ to $1_n$ that is, n phases of de-spread code (reception delay amounts) corresponding to comparatively high ones of the determined correlation magnitudes which are designated in the descending order.

Operation of the CDMA receiving apparatus is described with reference to FIGS. 8 and 9.

A reception signal A is a modulated signal whose signal spectrum is spread by a spread code when it is transmitted from the transmission side. Consequently, upon reception of the reception signal A, the synchronization detection and phase tracking section 4 modulates the reception signal A by successively displacing the phase of a de-spread code (same code as the spread code but inverse in polarity) to determine correlation magnitudes. Then, those of the correlation magnitudes which are higher than a threshold value designated in advance are determined, and each phase of the de-spread code corresponding to the determined correlation magnitudes is indicated to the de-spreading sections 5 of the FINGER processing sections $1_1$ to $1_n$ that is, n phases of de-spread code (reception delay amounts) corresponding to comparatively high ones of the determined correlation magnitudes which are designated in the descending order.

The correlators 8 of the de-spreading section 5 modulate the reception signal with the de-spread code at the respective designated timings (phases) to de-spread the reception signal A, and outputs correlation magnitudes of the de-spread reception signal A to the channel estimator 12 and the detection section 13. Each reception signal A of the multi-paths can be separated by de-spreading the reception signal A at timings corresponding to the individual paths.

In this instance, the channel estimator 12 estimates a displacement in phase caused by fading and outputs the estimated displacement to the detection section 13. The detection section 13 interpolates a symbol position of the de-spread reception signal using a vector estimated by the channel estimator 12 and outputs a resulting signal as detection data C.

The detection data C detected by the n FINGER processing sections $1_1$ to $1_n$ in this manner are sent to and added by the RAKE composition section 2, and a result of the addition is outputted to the decoding section 3. The decoding section 3 performs decoding processing including error correction to the reception signal from the RAKE composition section 2.

FIG. 10 shows a block diagram of a construction of a CDMA receiving apparatus disclosed in Japanese Patent Laid-Open Application No. Heisei 8-256084. Referring to FIG. 10, the CDMA receiving apparatus shown includes an antenna 101, a mixer 102, an oscillator 103, a correlator 104, a PN (Pseudo Noise=de-spread code) load signal control circuit 105, PN generators 106 to 108, a delay difference detection circuit 109, a correlation magnitude detection circuit 110, de-spreading circuits 111 to 113, delay lock loops 115 to 117, demodulation sections 118 to 120, delay correction circuits 121 to 123, multiplication circuits 124 to 126, an addition circuit 127, and a normalization circuit 114.

In operation, a spread signal received by the antenna 101 is converted into a base band signal by the mixer 102 and the oscillator 103, and the base band signal is outputted to the correlator 104, de-spreading circuits 111 to 113 and the demodulation sections 118 to 120. The correlator 104 detects a correlation of the reception signal to a PN code (de-spread signal) similar to that used on the transmission side while successively displacing the phase of the PN code to determine correlation magnitudes corresponding to a plurality of paths (in the arrangement shown in FIG. 10, the correlator 104 includes three correlators).

The PN load signal control circuit 105 selects three phases corresponding to the three highest correlation magnitudes obtained by the correlator 104 in descending order and outputs the three phases as PN load signals LDn (LD 1 to LD3) to the PN generators 106 to 108. The PN generators 106 to 108 respectively generate PN signals PNn (PN1 to PN3) synchronized with the PN load signals LDn and clock signal from the delay lock loop circuits 115 to 117.

Consequently, PN signals synchronized in phase with the multi-paths can be obtained. The PN signals PNn form the PN generators 106 to 108 are supplied to the demodulation sections 118 to 120, respectively, and the correlation magnitude detection circuit 110. The demodulation sections 118 to 120 demodulate the reception signal based on the PN signals PNn. In this instance, the top bits of the PN signals PNn are supplied to the delay difference detection circuit 109. The delay difference detection circuit 109 detects phase differences of the PN codes PNn based on the received top bits of the PN signals PNn and controls the delay correction circuits 121 to 123 to correct the phase differences corresponding to the delay differences of the multi-paths.

The correlation magnitude detection circuit 110 determines correlation magnitudes using the reception signal and the PN codes PNn supplied from the PN generators 106 to 108 to the demodulation sections 118 to 120. The multiplication circuits 124 to 126 multiply the demodulation signals from the demodulation sections 118 to 120 received through the delay correction circuits 121 to 123 by the correlation magnitudes of the correlation magnitude detection circuit 110 as weight coefficients and output results of the multiplication to the addition circuit 127, by which the results of the multiplication are added.

Even the conventional CDMA receiving apparatus described above with reference to FIGS. 8 and 10 can accurately perform phase tracking for a spread reception signal whose reception delay amount (that is, timing of de-spreading) varies in a period substantially equal to the processing time of the synchronization detection and phase tracking section. However, the conventional CDMA receiving apparatus has a subject to be solved in that it cannot accurately perform phase tracking for another spread reception signal whose reception delay amount varies in a period shorter than the processing time of the synchronization detection and phase racking section. In other words, since the synchronization detection and phase tracking section searches for effective paths from within the reception signal and tracks the phase as a detected path, it performs processing to average the obtained correlation magnitudes in a period of a frame of the signal. Accordingly, the conventional CDMA receiving apparatus cannot accurately perform phase tracking to the reception signal when the reception delay amount varies in a period shorter than the average processing time of the synchronization detection and phase tracking section.

SUMMARY OF THE INVENTION

It is an object of the present invention to provide a CDMA receiving apparatus which can accurately effect synchronous follow-up to a reception signal even in an environment wherein the reception delay amount varies in a period shorter than the processing time of a synchronization detection and phase tracking section.

In order to attain the object described above, according to the present invention, there is provided a CDMA receiving apparatus comprising a plurality of reception processing sections individually including de-spreading sections for receiving a signal spread with a spread code and arriving through a plurality of paths as a reception signal and de-spreading the inputted reception signal with a de-spread code and channel estimation sections for estimating the paths based on results of the processing of the de-spreading sections, and a synchronization detection and phase tracking section for outputting reception delay amounts of the reception signal in a predetermined period to the de-spreading sections of the reception processing sections, each of the de-spreading sections including a plurality of correlators for individually correcting, when the reception delay amounts are received from the synchronization detection and phase tracking section, the reception delay amounts and performing de-spreading processing, each of the channel estimation sections including a plurality of level measurement sections for individually receiving the correlation magnitudes outputted from the corresponding plurality of correlators to measure levels of the correlation magnitudes, a level comparison section for comparing the measurement levels of the plurality of level measurement sections, a path change-over section for outputting the correlation magnitude of that one of the correlators which is detected to output the highest measurement level by the level comparison section as a reception signal from the path, a channel estimator for performing estimation of the path based on the correlation magnitude of the correlator selected by the path change-over section, and a detection section for correcting a symbol position of the reception signal based on the correlation magnitude selected by the path change-over section and an output of the channel estimator and outputting the corrected symbol position as detection data.

In the CDMA receiving apparatus, when a reception delay amount is received from the synchronization detection and phase tracking section, the plurality of correlators of each of the de-spreading sections correct the reception delay amounts and perform de-spreading processing based on the corrected delay amounts and each of the channel estimation sections measures correlation magnitude levels of the correlation magnitudes of the correlators and outputs the correlation magnitude of that one of the correlators which is detected to output the highest measurement level as a reception signal from the path, the CDMA receiving apparatus can accurately effect synchronous follow-up to the reception signal even under an environment wherein the reception delay amount varies in a period shorter than the processing time of the synchronization detection and phase tracking sections.

Preferably, the plurality of correlators include a first correlator for performing de-spreading processing with the reception delay amount, a second correlator for performing de-spreading processing with a phase leading by a predetermined phase from the reception delay amount, and a third correlator for performing de-spreading processing with another phase lagging by the predetermined phase from the reception delay amount. The provision of the first, second and third correlators allows precise correction of the reception delay amount of the reception signal.

As an alternative, preferably the plurality of correlators include a first correlator for performing de-spreading with a phase of a delay amount indicted by the synchronization detection and phase tracking section and outputting a resulting correlation value, a second correlator for performing de-spreading with a phase leading, where 1 bit of a spread code is represented by 1 chip, by 0.5 chips form the delay amount indicated by the synchronization detection and phase tracking section and outputting a resulting correlation value, a third correlator for performing de-spreading with a phase lagging by 0.5 chips from the delay amount indicated by the synchronization detection and phase tracking section and outputting a resulting correlation value, a fourth correlator for performing de-spreading with a phase leading by 0.25 chips from the delay amount indicated by the synchronization detection and phase tracking section and outputting a resulting correlation value, and a fifth correlator for performing de-spreading with a phase lagging by 0.25 chips from the delay amount indicated by the synchronization detection and phase tracking section and outputting a resulting correlation value. The provision of the first to fifth correlators assures a high degree of accuracy in timing correction of de-spreading.

Preferably, the CDMA receiving apparatus further comprises a delay amount comparison section for comparing the reception delay amounts of the correlators selected by the path change-over sections of the plurality of reception processing sections and allowing, when a plurality of ones of the reception processing sections exhibit an equal reception delay amount, only one of the reception processing sections to perform reception processing. In the CDMA receiving apparatus, reception processing based on an equal reception delay amount by a plurality of ones of the reception processing sections is eliminated. Consequently, the signal can be received accurately and otherwise possible deterioration of the reception signal quality can be prevented.

The CDMA receiving apparatus may be constructed such that each of the reception processing sections includes a path selection section for selectively setting an effective path when an effective path signal is received from the delay amount comparison section so that whether a path is effective or ineffective can be indicated in accordance with a result of the comparison by the delay amount comparison section. In particular, the delay amount comparison section indicates, if the delay amounts being received by the reception processing sections at present are different from one another, with effective path signals to the path selection sections of the reception processing sections that their paths are effective so that the reception processing sections may perform reception processing with the signal delay amounts, but indicates, if the delay amount comparison section detects as a result of the comparison of the reception delay amounts from the reception processing sections that a plurality of ones of the reception processing sections receive with an equal delay amount, to the path selection section of only one of the reception processing sections with an effective path signal that its path is effective while the delay amount comparison section indicates to each of the path selection sections of the remaining ones of the reception processing sections with an effective path signal that its path is ineffective. By such indication, accurate reception and reception quality measurement can be maintained.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1A:
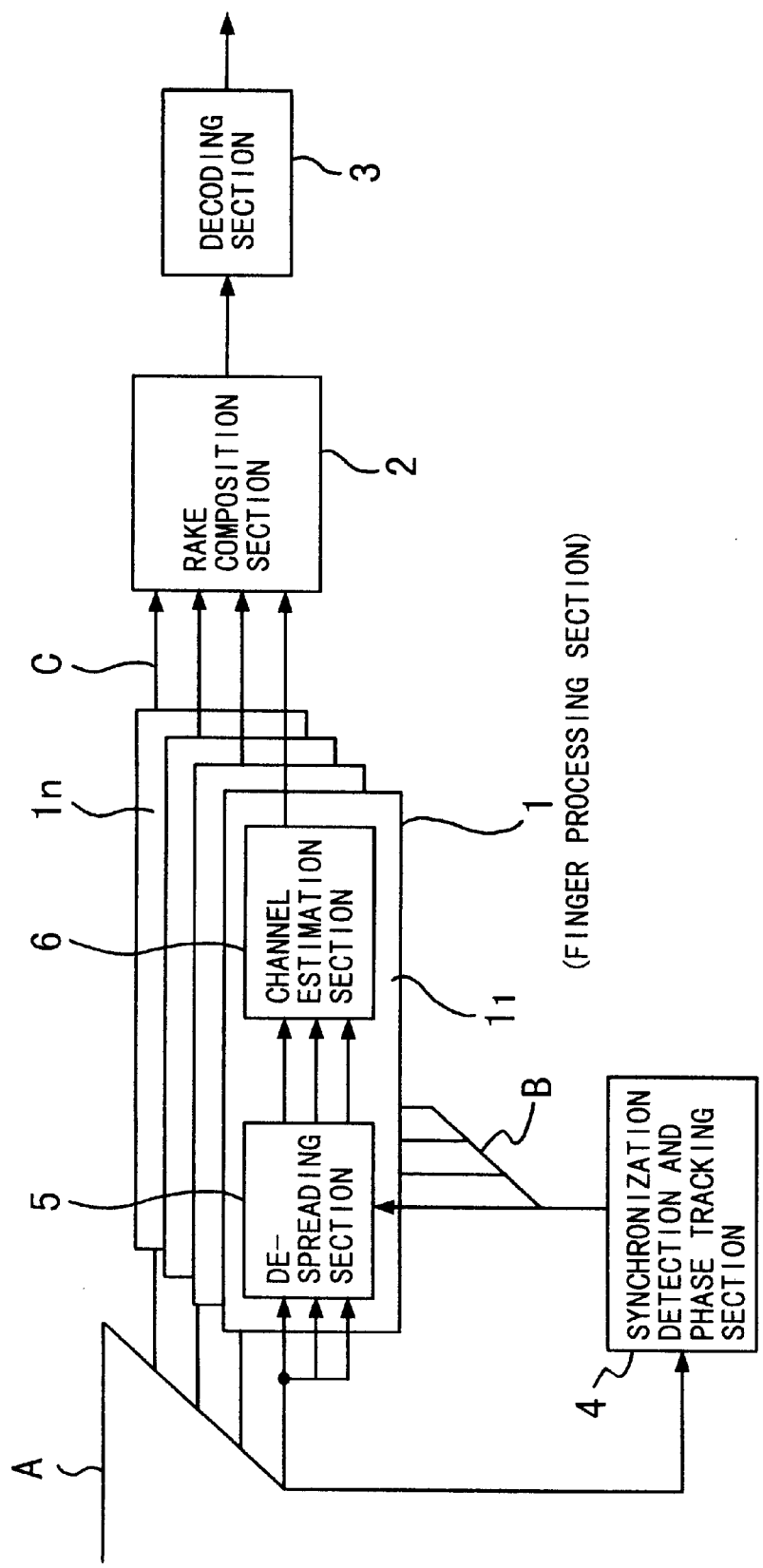
FIG. 1(a) is a block diagram showing a construction of a CDMA receiving apparatus to which the present invention is applied.

Referring first to FIG. 1(a), there is shown a CDMA receiving apparatus to which the present invention is applied. The CDMA receiving apparatus shown includes a plural number of FINGER processing sections 1 equal to the number of paths to be received, a RAKE composition section 2, a decoding section 3 and a synchronization detection and phase tracking section 4. In the CDMA receiving apparatus shown in FIG. 1(a), n FINGER processing sections 1 ($1_1$ to $1_n$) are provided so that each signal from n paths can be received, respectively. The synchronization detection and phase tracking section 4 searches for and acquires an effective path from a reception signal A and tracks the reception signal A of the effective path. Consequently, the synchronization detection and phase tracking section 4 outputs reception delay amounts of the reception signal of the individual paths individually to the FINGER processing sections $1_1$ to $1_n$.

Figure 1B:
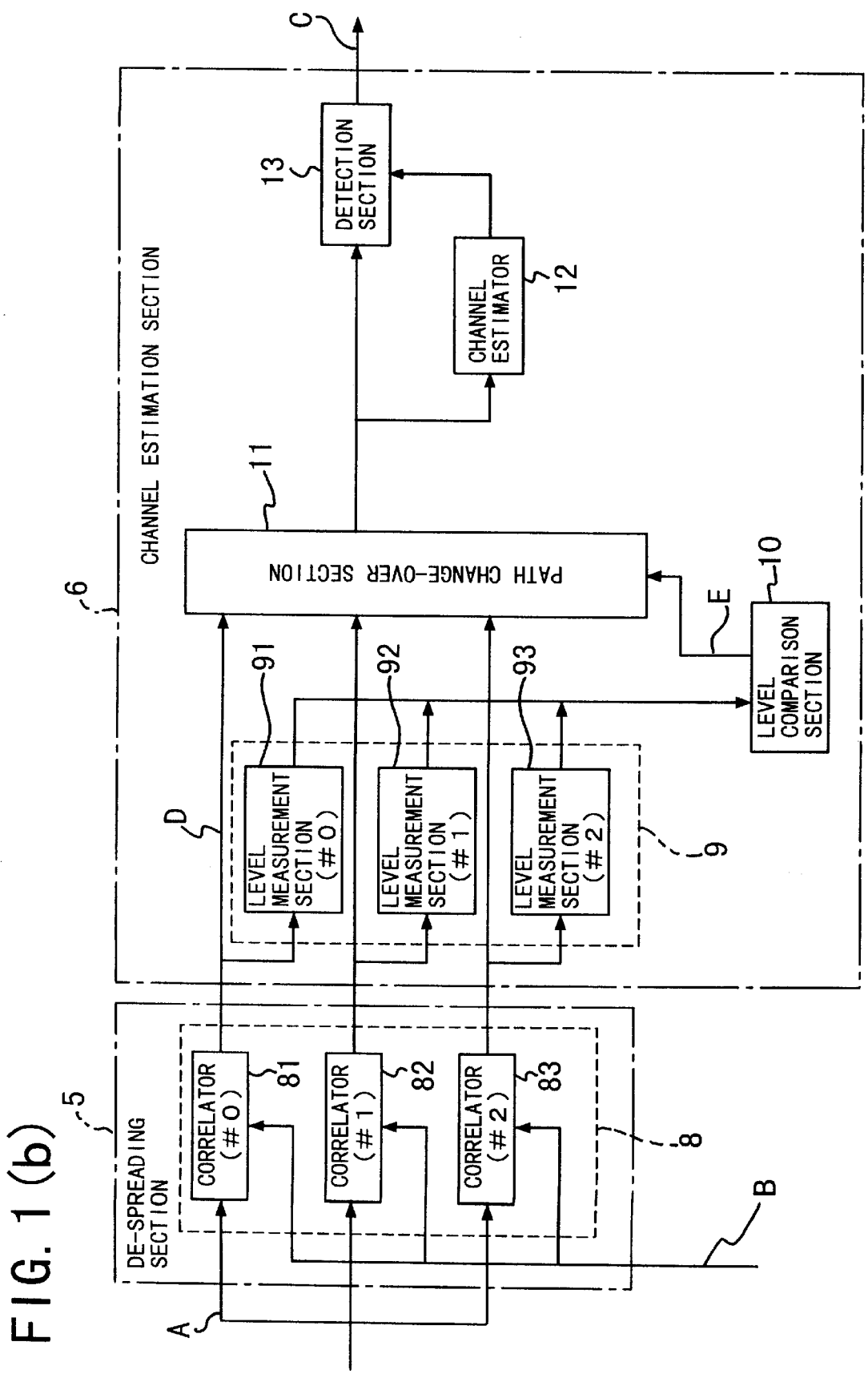
FIG. 1(b) is a block diagram of a FINGER processing section which is employed in the CDMA receiving apparatus of FIG. 1.

Referring now to FIG. 1(b), each of the FINGER processing sections 1 ($1_1$ to $1_n$) described above includes a de-spreading section 5 which in turn includes three correlators 81 to 83. The FINGER processing section further includes a channel estimation section 6 which in turn includes three level measurement sections 9 (91 to 93), a level comparison section 10, a path change-over section 11, a channel estimator 12 and a detection section 13.

An outline of the operation of the CDMA receiving apparatus is described below with reference to FIGS. 1(a) and 1(b).

The reception signal A transmitted as a spread code signal is inputted to the synchronization detection and phase tracking section 4 and the correlators 8 of the de-spreading section 5 of the FINGER processing sections $1_1$ to $1_n$. Each of the correlators 8 in the FINGER processing sections $1_1$ to $1_n$ includes three correlators 81 to 83 as described hereinabove. The correlators 81 to 83 process the reception signal with an instruction delay amount from the synchronization detection and phase tracking section 4, whose phase is successively displaced like ±d, ±2d, . . . .

The synchronization detection and phase tracking section 4 searches for effective paths from the reception signal A, allocates the FINGER processing sections $1_1$ to $1_n$ for the individual paths and reports phases of de-spread codes corresponding to delay amounts of the individual paths to the correlators 82 of the FINGER processing sections $1_1$ to $1_n$. Here, each of the correlators 81 performs processing with a phase leading by d of the de-spread code reported to the correlator 82 while each of the correlators 83 performs processing with a phase lagging by d of the de-spread code reported to the correlator 82. In this manner, the correlators 81 to 83 of each of the FINGER processing sections $1_1$ to $1_n$ perform de-spread processing of the reception signal with a de-spread code of a phase leading by d of a phase reported from the synchronization detection and phase tracking section 4, another de-spread code of the phase reported from the synchronization detection and phase tracking section 4 and a further de-spread code of a phase lagging by d from the phase reported from the synchronization detection and phase tracking section 4, respectively, and send resulting correlation magnitudes to the corresponding level measurement sections 91 to 93, respectively, and the path change-over section 11.

Each of the level measurement sections 91 to 93 calculates a correlation magnitude level from a received correlation magnitude and outputs the correlation magnitude level to the level comparison section 10. The level comparison section 10 compares the correlation magnitude levels from the correlators 81 to 83 and indicates that one of the correlators 81 to 83 which outputs the highest correlation magnitude level to the path change-over section 11. The path change-over section 11 selects one of the correlators 81 to 83 indicated by the level comparison section 10 and outputs the correlation magnitude of the selected one of the correlators 81 to 83 to the channel estimator 12 and the detection section 13. The channel estimator 12 performs estimation of a path using the output of the one of the correlators 81 to 83 selected by the path change-over section 11 to determine a channel estimation vector and outputs the channel estimation vector to the detection section 13.

The detection section 13 multiplies the correlation magnitude selectively outputted from the path change-over section 11 by the channel estimation vector outputted from the channel estimator 12 to interpolate symbol positions of the reception signal and outputs results of the interpolation as detection data C to the RAKE composition section 2. Such detection data C are outputted from the FINGER processing sections 11 to $1_n$ to the RAKE composition section 2 in this manner.

The RAKE composition section 2 performs weighted addition of the detection data C outputted from the FINGER processing sections $1_1$ to $1_n$ and outputs a result of the weighted addition to the decoding section 3. The decoding section 3 performs decoding processing including error correction processing for the data processed by the RAKE composition section 2.

Operation of the CDMA receiving apparatus is described in more detail with reference to FIGS. 1(a), 1(b), 2 and 3.

A reception signal A arriving as a spread code signal at the CDMA receiving apparatus is inputted to the synchronization detection and phase tracking section 4. The synchronization detection and phase tracking section 4 demodulates the reception signal A using a de-spread code, which is same as a spread code used for spreading on the transmission side but inverse in polarity, while successively displacing the phase of the de-spread code little by little to determine correlation magnitudes. Here, the synchronization detection and phase tracking section 4 discriminates a correlation magnitude level higher than a certain threshold value designated in advance as an effective path and determines a timing of de-spreading (or a phase of the spread code) then as a reception delay amount.

Figure 2:
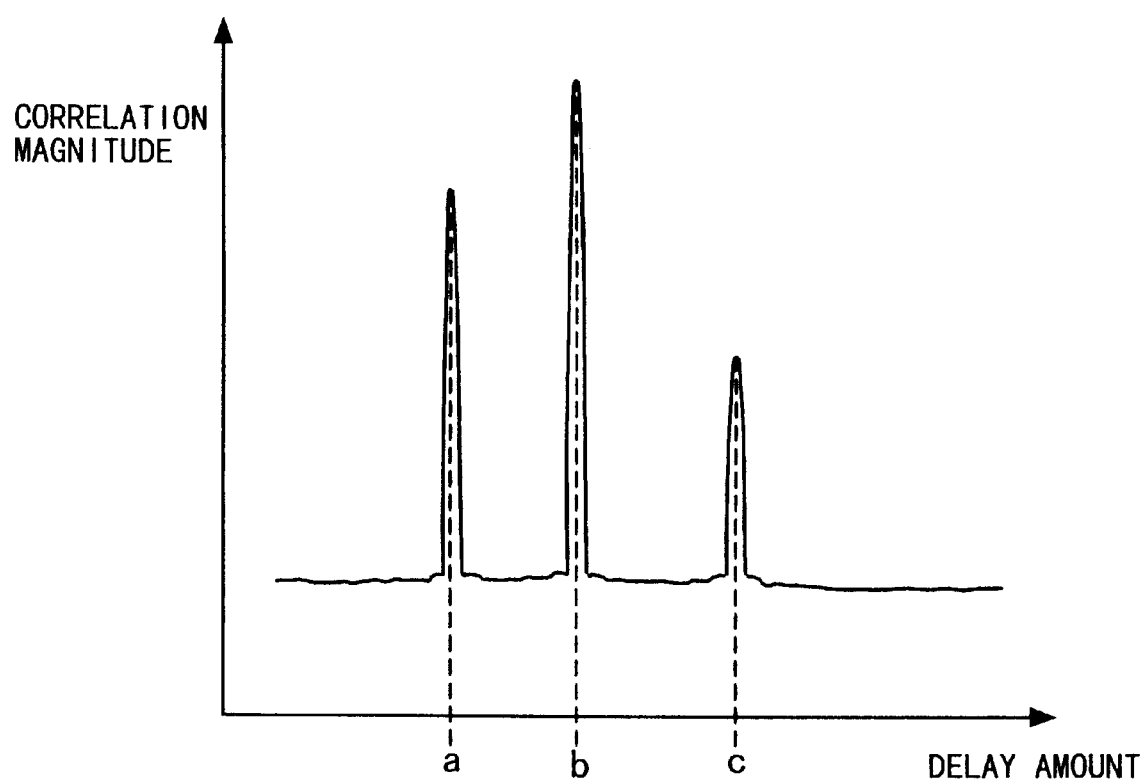
FIG. 2 is a diagram illustrating a delay profile.

FIG. 2 is a graph showing a delay profile which indicates a relationship between the reception delay amount and the correlation magnitude determined by the synchronization detection and phase tracking section 4.

Referring to FIG. 2, the axis of abscissa indicates the reception delay amount and the axis of ordinate indicates the correlation magnitude level. It can be seen from FIG. 2 that three paths having different delay times are present and hence multi-paths are present. It is to be noted that reference symbols a, b and c denote delay amounts at which the correlation magnitude have peaks. Further, it can be seen that the correlation magnitude of the path having the delay amount b from among the delay amounts a to c is the highest among them.

Referring to FIG. 2, the axis of abscissa indicates the reception delay amount and the axis of ordinate indicates the correlation magnitude level. It can be seen from FIG. 2 that three paths having different delay times are present and hence multi-paths are present. It is to be noted that, reference symbols a, b and c denote delay amounts at which the correlation magnitude have peaks. Further, it can be seen that the correlation magnitude of the path having the delay amount b from among the delay amounts a to c is the highest among them. It is noted that, the FINGER processing sections 1 are allocated in a one-by-one corresponding relationship to the paths having the delay amounts a, b and c, and to the correlators 82 of the FINGER processing sections 1, a de-spread code is allocated at timings corresponding to the delay amounts a, b and c.

Meanwhile, to the correlators 81 of the individual FINGER processing sections 1, the de-spread code is allocated at timings leading by the phase difference d from the delay amounts a, b and c, and to the correlators 83, the de-spread code is allocated at timings lagging by the phase difference d from the delay amounts a, b and c. The phase difference d can be set freely as a parameter. Each of the correlators 81 to 83 demodulates the reception signal A with the de-spread code given thereto to effect de-spreading and outputs a result of the de-spreading to a corresponding one of the level measurement sections 91 to 93 and also to the path change-over section 11. Here, if the delay amounts a, b and c represent the maximum values of the correlation magnitudes of the corresponding paths accurately, then the outputs of the correlators 82 are selected by the path change-over sections 11, and channel estimation and detection are performed based on the outputs of the correlators 82.

However, since the processing period of the synchronization detection and phase tracking sections 4 is substantially equal to the period of a frame of signal, there is the possibility that, due to an influence of fading within the processing period, the delay amounts indicated by the synchronization detection and phase tracking sections 4 and the delay amounts which actually exhibit a maximum correlation magnitudes may become different from each other, resulting in variation of the correlation magnitude levels. An example of a delay profile in such an instance is shown in FIG. 3.

Figure 3:
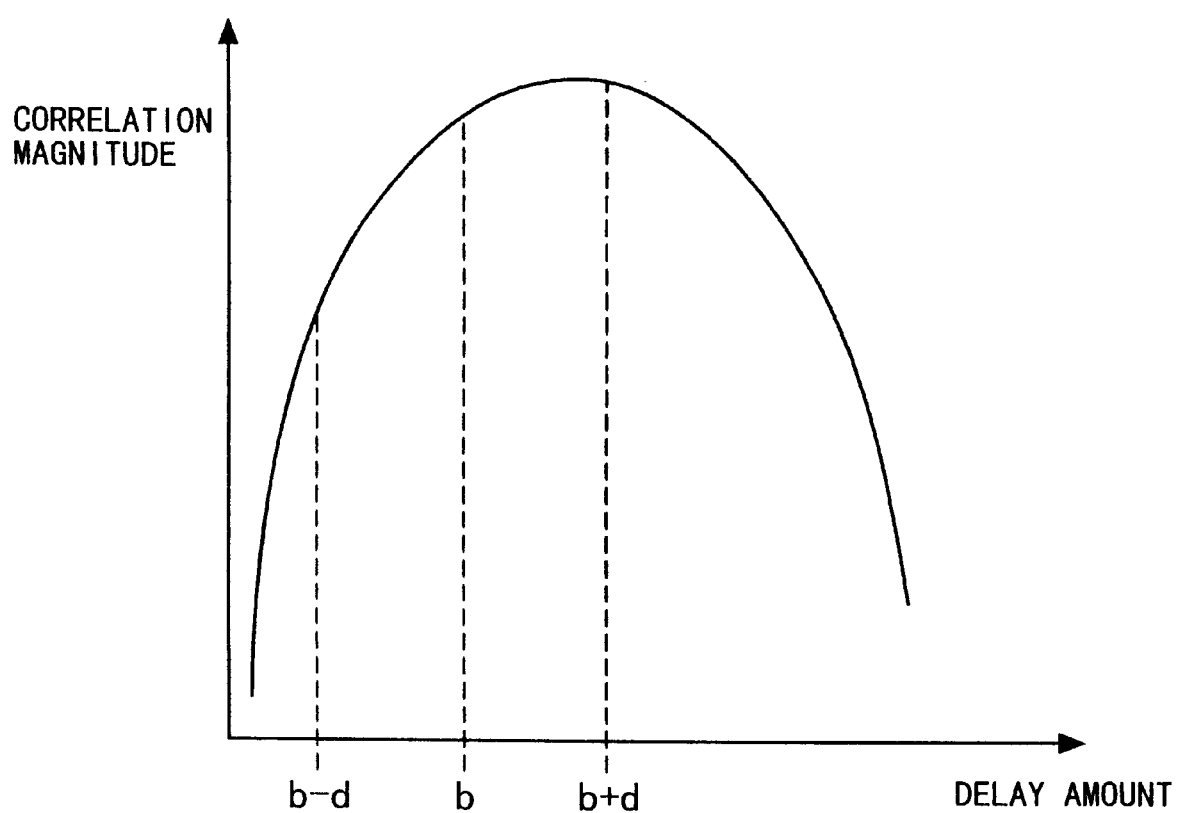
FIG. 3 is an enlarged diagram showing part of the delay profile of FIG. 2.

The profile of FIG. 3 only shows the correlation magnitude level around the delay amount b. Here, while the indication of the delay amount of each of the synchronization detection and phase tracking sections 4 is a delay amount denoted by reference symbol b, it can be seen in FIG. 3 that the maximum value of the actual correlation magnitude is present in the proximity of b+d.

In this instance, in the CDMA receiving apparatus of the present embodiment, to each of the correlators 81, the de-spread code is allocated at a timing leading by the phase difference d from the delay amount denoted by reference symbol b, and to the corresponding correlator 82, the de-spread code is allocated at a timing corresponding to the delay amount indicated by reference symbol b. Further, to the corresponding correlator 83, the de-spread code is allocated at a timing lagging by the phase difference d from the delay amount denoted by symbol b. The correlators 81 to 83 perform de-spreading processing at the respective timings and outputs resulting correlation magnitude levels.

The correlation magnitudes outputted from the correlators 81 to 83 are supplied to the level measurement sections 91 to 93, by which the levels thereof are measured, respectively. The measured levels are outputted to the level comparison section 10. The level comparison section 10 compares the measured levels of the level measurement sections 91 to 93 and instructs the path change-over section 11 to select that one of the correlators 81 to 83 which outputs the highest correlation magnitude level. As a result, in the case of the example illustrated in FIG. 3, the correlator 83 which outputs the maximum value b+d of the correlation magnitude is selected.

In this manner, correlation magnitudes are determined within the range of +d with respect to a delay amount indicated by the synchronization detection and phase tracking section 4 to select one of the correlators which exhibits the highest correlation magnitude level. As a result, stabilized reception wherein a displacement of the phase of a reception signal caused by fading is cancelled can be achieved.

Figure 4:
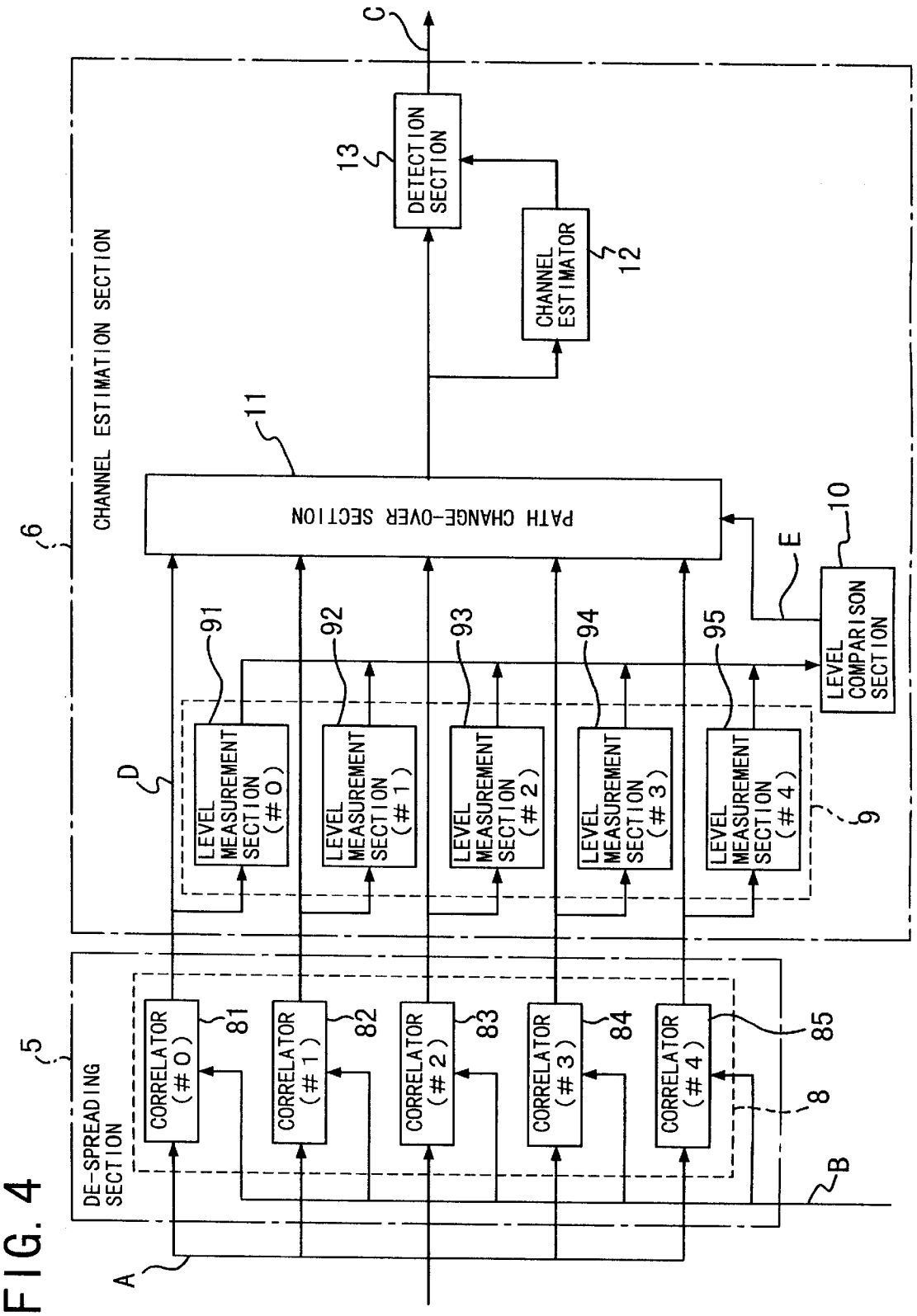
FIG. 4 is a block diagram showing a modification to the FINGER processing section shown in FIG. 1(B)

FIG. 4 shows a block diagram of another FINGER processing section employed in the CDMA receiving apparatus to which the present invention is applied. The FINGER processing section 1 shown in FIG. 4 is a modification to but is different from the FINGER processing section 1 shown in FIG. 1(b) in that it includes increased numbers of, i.e., five, correlators 8 (81 to 85) and level measurement sections 9 (91 to 95) comparing with those, i.e., three, in the FINGER processing section 1 shown in FIG. 1(b).

Referring to FIG. 4, the correlator 81 performs de-spreading with a phase leading by 0.5 chips (1 chip=1 bit of a spread code) from a delay amount indicated by a corresponding synchronization detection and phase tracking section 4 and outputs a resulting correlation magnitude. The correlator 82 performs de-spreading with another phase leading by 0.25 chips from the delay amount indicated by the synchronization detection and phase tracking section 4 and outputs a resulting correlation magnitude. The correlator 83 performs de-spreading with a phase of the delay amount indicated by the synchronization detection and phase tracking section 4 and outputs a resulting correlation magnitude. The correlator 84 performs de-spreading with a phase lagging by 0.25 chips from the delay amount indicated by the synchronization detection and phase tracking section 4 and outputs a resulting correlation magnitude. The correlator 85 performs de-spreading with a phase lagging by 0.5 chips from the delay amount indicated by the synchronization detection and phase tracking section 4 and outputs a resulting correlation magnitude.

In other words, each of the FINGER processing sections $1_1$ to $1_n$ includes, in addition to the correlator 83 which outputs a correlation magnitude at a timing of a delay amount indicated by the synchronization detection and phase tracking section 4, the correlators 82 and 84 and the correlators 81 and 85 which output correlation magnitudes at intervals of +0.25 chips and at intervals of 0.5 chips, respectively.

The level measurement sections 91 to 95 measure the correlation magnitude levels of the correlators 81 to 85, respectively, and output them to the level comparison section 10. The level comparison section 10 compares the correlation magnitude levels of the correlators 81 to 85 measured by the level measurement sections 91 to 95 and instructs the path change-over section 11 to select that one of the correlators 81 to 85 which outputs the highest correlation magnitude. The path change-over section 11 selects that one of the correlators 81 to 85 which exhibits the highest correlation magnitude level in accordance with the instruction from the level comparison section 10 and outputs the correlation magnitude of the selected one of the correlators 81 to 85. The channel estimator 12 effects estimation of the path using the output of that one of the correlators 81 to 85 selected by the path change-over section 11 to determine a channel estimation vector and outputs the channel estimation vector to the detection section 13.

The detection section 13 multiplies the correlation magnitude outputted from the path change-over section 11 by the channel estimation vector outputted from the channel estimator 12 to interpolate symbol positions of the reception signal and outputs a result of the interpolation to the RAKE composition section 2. The RAKE composition section 2 performs weighted addition of the detection data outputted from the FINGER processing sections $1_1$ to $1_n$ and outputs a result of the weighted addition to the decoding section 3. The decoding section 3 performs decoding processing including error correction processing for the weighted detected data.

Operation of the FINGER processing section 1 shown in FIG. 4 is described in more detail. Basic operation of the FINGER processing section 1 is similar to that of the FINGER processing section 1 shown in FIG. 1(b).

First, a reception signal A in the form of a spread signal is supplied to the synchronization detection and phase tracking section 4, which demodulates the reception signal A using a de-spread code, which is same as a spread code used for spreading on the transmission side but inverse in polarity, while successively displacing the phase of the de-spread code little by little to determine correlation magnitudes. In this instance, the synchronization detection and phase tracking section 4 determines a one of correlation magnitude levels higher than a predetermined threshold vale designated in advance and discriminates that the path corresponding to the correlation magnitude is an effective path. Then, the de-spread code is set to the correlator 83 of the corresponding FINGER processing section 1 at a timing of the delay amount of the path discriminated to be effective.

In this instance, the de-spread code is set to the correlator 81 of the corresponding one of the FINGER processing sections 1 at a timing of a phase leading by 0.5 chips from the delay amount of the effective path, and the de-spread code is set to the correlator 82 of the FINGER processing section 1 at another timing of a phase leading by 0.25 chips from the delay amount of the effective path. Further, the de-spread code is set to the correlator 84 of the corresponding FINGER processing section 1 at a timing of a phase lagging by 0.25 chips from the delay amount of the effective path, and the de-spread code is set to the correlator 85 of the corresponding FINGER processing section 1 at another timing of a phase delay by 0.5 chips from the delay amount of the effective path. Then, de-spreading processing is performed by the correlators 81 to 85 and resulting correlation magnitudes are outputted to the level measurement sections 91 to 95, respectively, and also to the path change-over section 11.

The level measurement sections 91 to 95 measure the correlation magnitude levels of the correlators 81 to 85 and output them to the level comparison section 10. The level comparison section 10 instructs the path change-over section 11 to select one of the correlators 81 to 85 which outputs the height correlation magnitude. The path change-over section 11 selects one of the correlators 81 to 85 in accordance with the instruction. The channel estimator 12 and the detection section 13 perform channel estimation and detection processing, respectively, based on the selected output of the path change-over section 11.

By arranging five correlators in total at 0.25 chip intervals centered at the correlator 83 which outputs a correlation magnitude at a timing of a delay amount indicated by the synchronization detection and phase tracking section 4 in this manner, the accuracy in correction of the timing of de-spreading can be improved.

Figure 6:
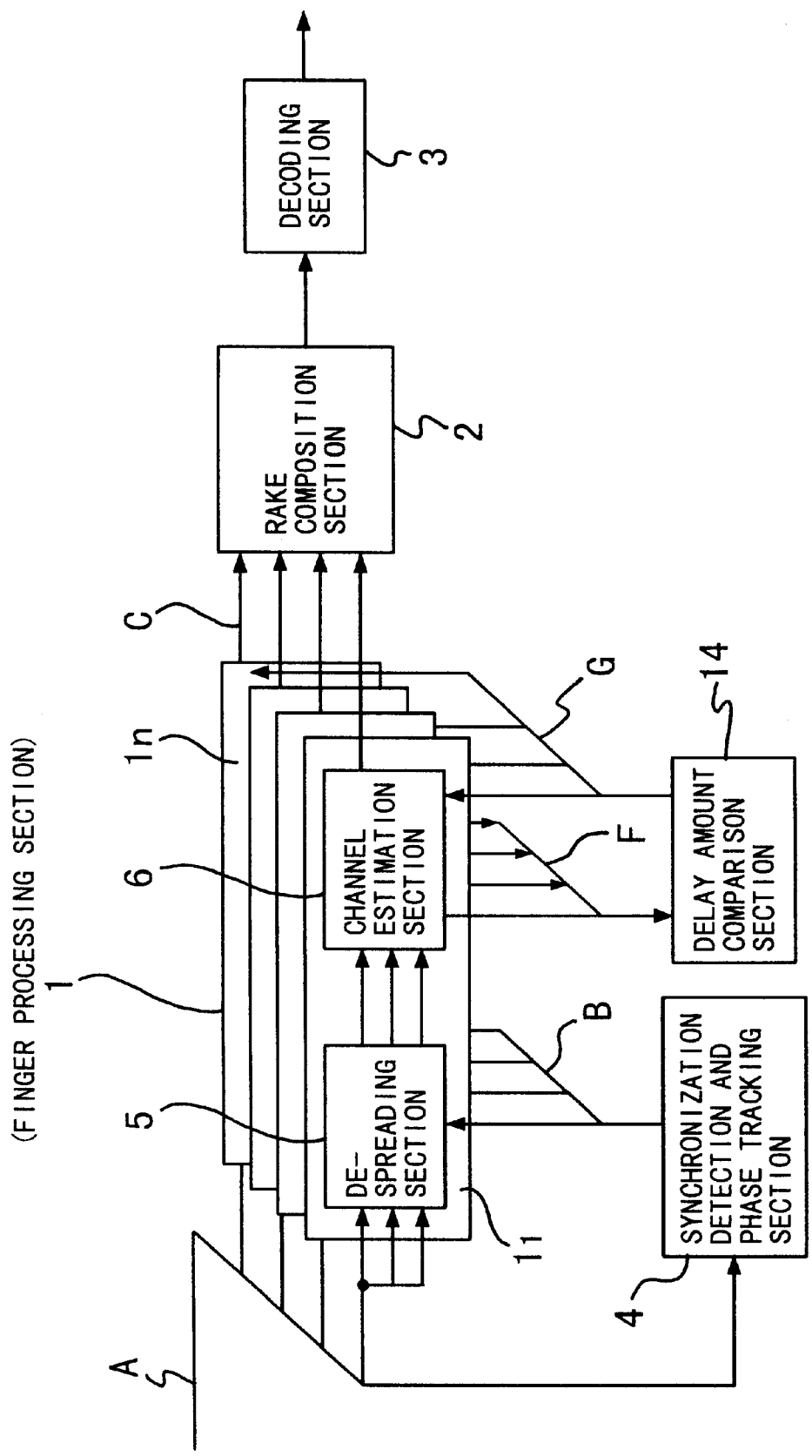
FIG. 6 is a block diagram showing a construction of another CDMA receiving apparatus to which the present invention is applied.

FIG. 6 shows a block diagram of another CDMA receiving apparatus to which the present invention is applied. The CDMA receiving apparatus shown in FIG. 6 is a modification to but is different from the CDMA receiving apparatus described hereinabove with reference to FIG. 1(*a*) in that it additionally includes a delay amount comparison section 14 for receiving a reception delay amount F and outputting an effective path signal G.

Figure 7:
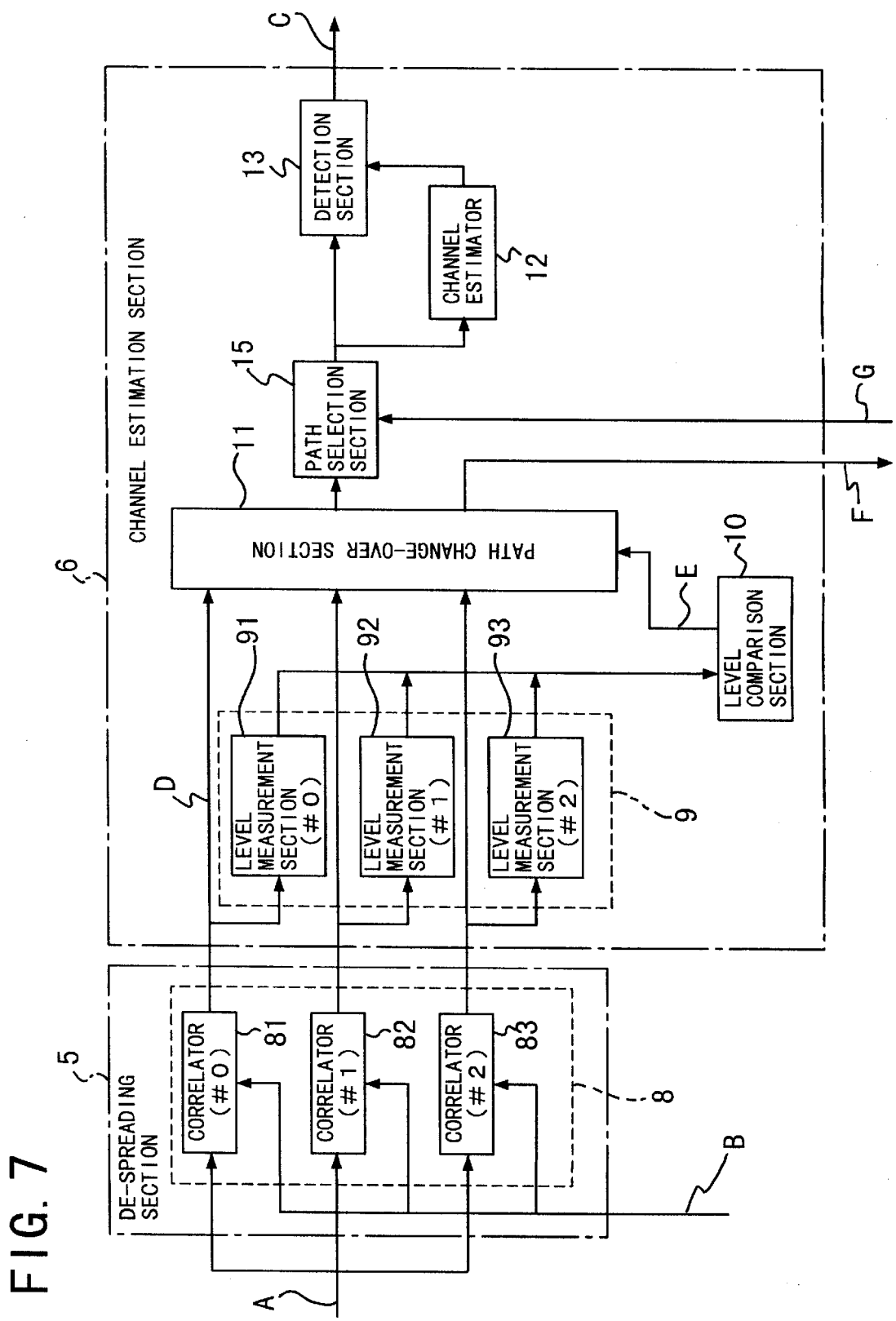
FIG. 7 is a block diagram showing a FINGER processing section incorporated in the CDMA receiving apparatus shown in FIG. 6.
Figure 8:
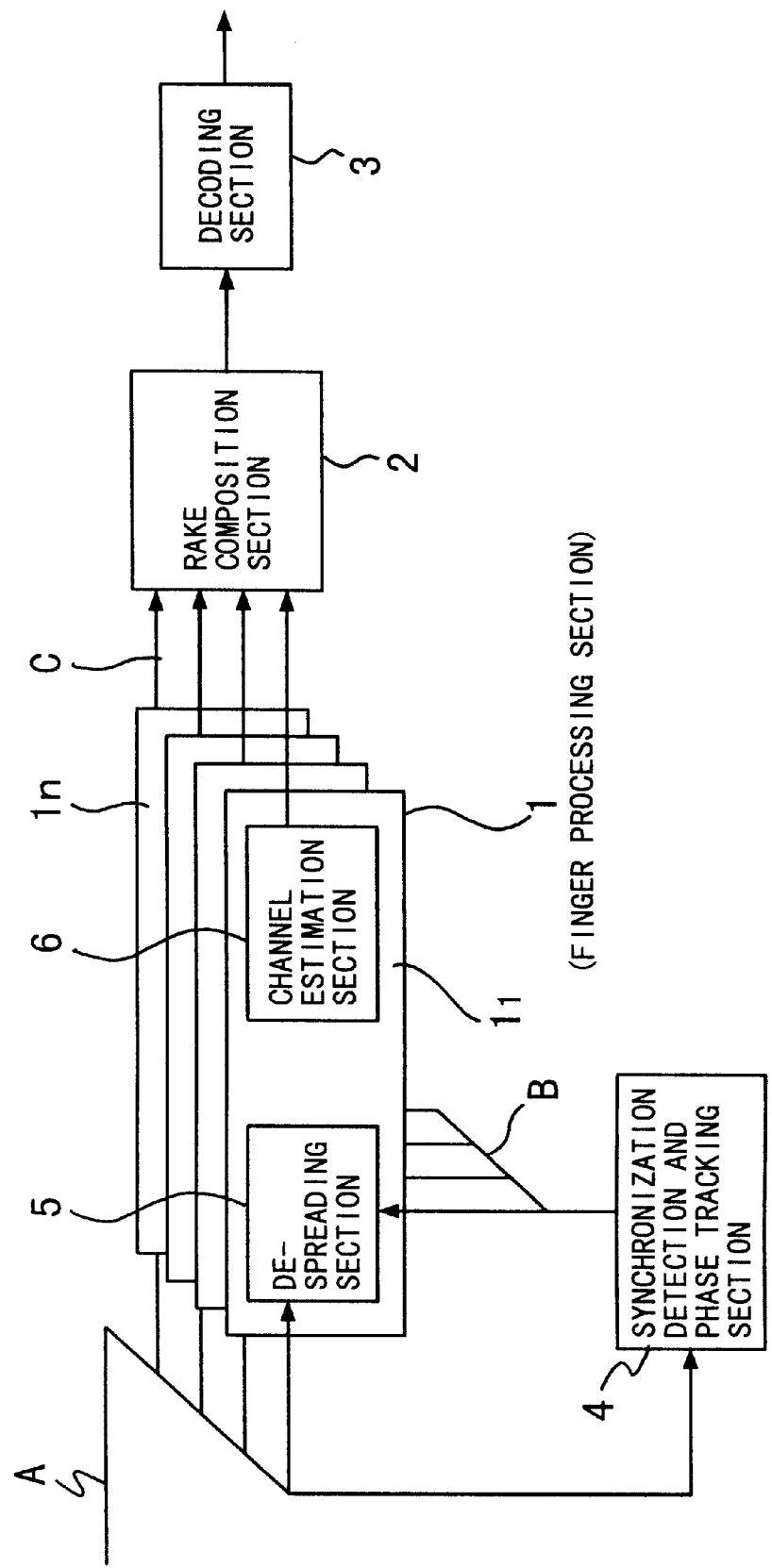
FIG. 8 is a block diagram showing a general construction of a CDMA receiving apparatus.
Figure 9:
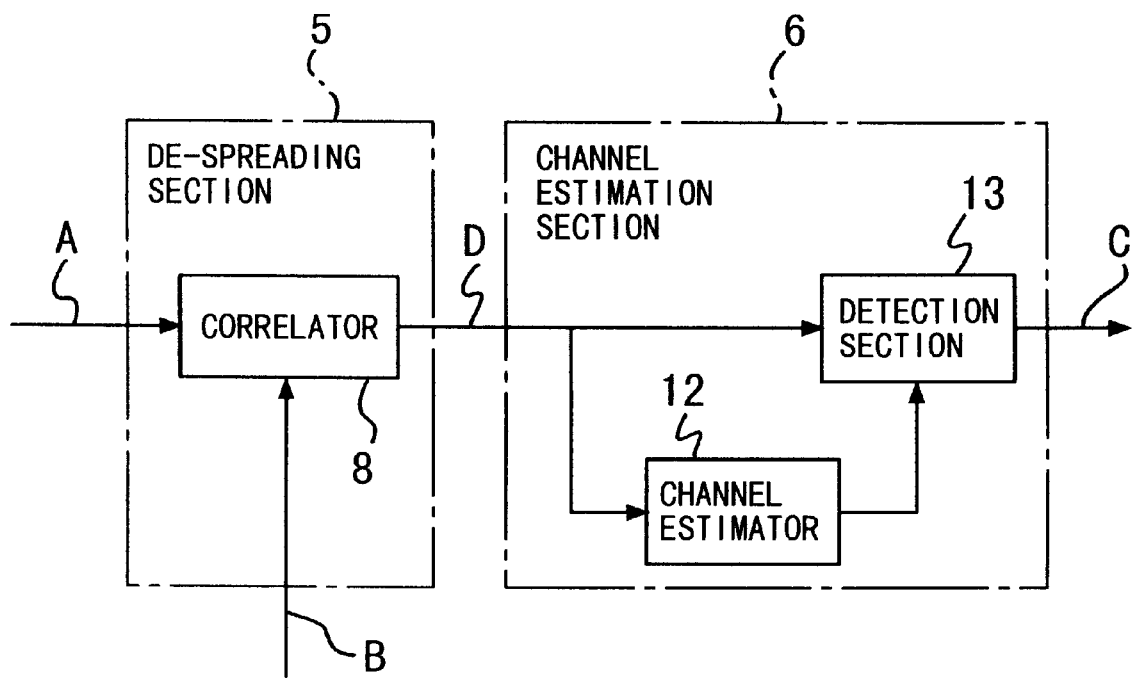
FIG. 9 is a block diagram showing a FINGER processing section employed in the CDMA receiving apparatus of FIG. 8.
Figure 10:
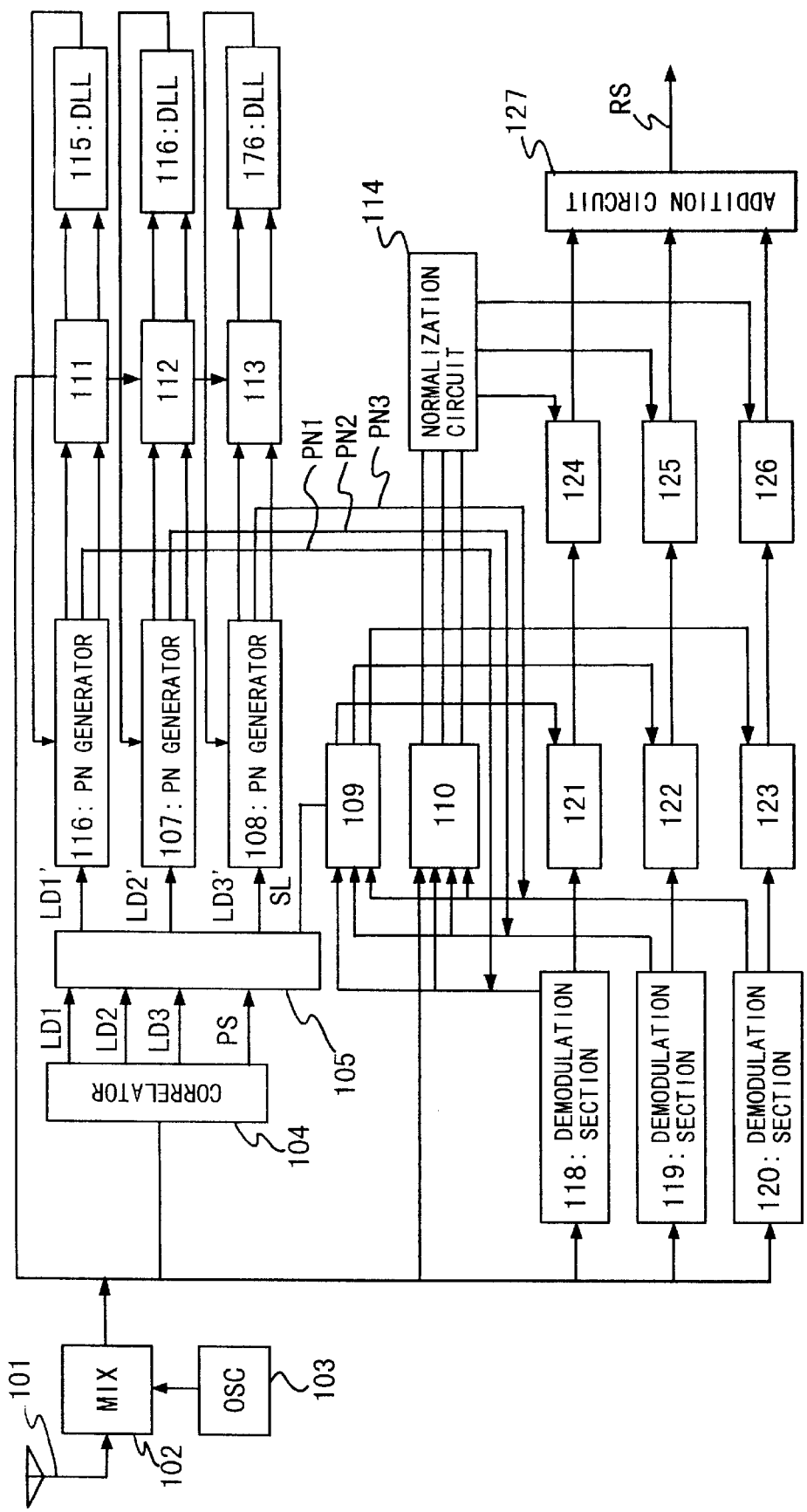
FIG. 10 is a block diagram showing a conventional CDMA receiving apparatus.

FIG. 7 shows a block diagram of a FINGER processing section 1 of the CDMA receiving apparatus shown in FIG. 6. The FINGER processing section 1 shown in FIG. 7 is a modification to but is different from the FINGER processing section 1 described hereinabove with reference to FIG. 1(*b*) in that it additionally includes a path selection section 15. Further, the path change-over section 11 outputs a reception delay amount F mentioned above to the delay amount comparison section 14. The path selection section 15 selectively sets an effective path when it receives an effective path signal G from the delay amount comparison section 14.

The additional functions are described. From among the delay amounts of timings de-spread by the correlators 81 to 83, the delay amount of that one of the correlators 81 to 83 selected by the path change-over section 11 is outputted as a reception delay amount F to the delay amount comparison section 14. The delay amount comparison section 14 thus compares such reception delay amounts F outputted from the FINGER processing sections $1_1$ to $1_n$.

Figure 5:
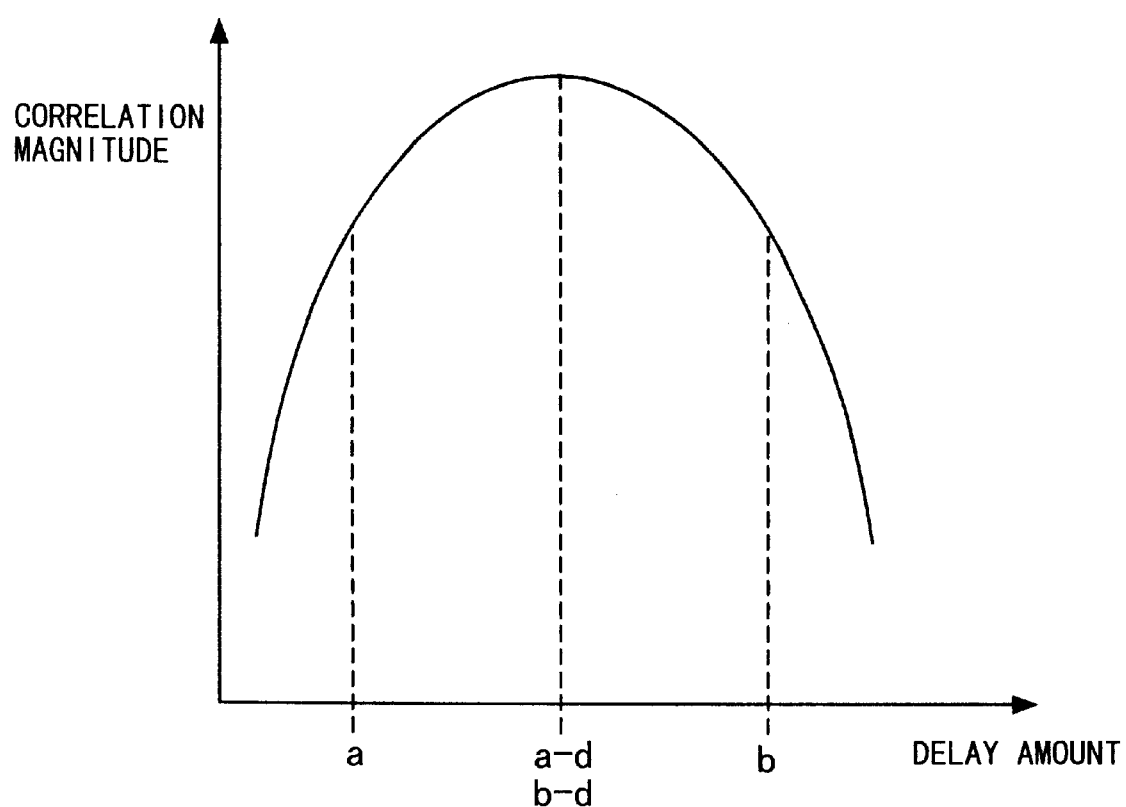
FIG. 5 is a diagram illustrating another delay profile.

If the delay amounts being received by the FINGER processing sections $1_1$ to $1_n$ at present are different from one another, then the delay amount comparison section 14 indicates with effective path signals G to the path selection sections 15 of the FINGER processing sections $1_1$ to $1_n$ that their paths are effective so that the FINGER processing sections $1_1$ to $1_n$ may perform reception processing with the signal delay amounts. On the other hand, if the delay amount comparison section 14 detects as a result of the comparison of the reception delay amounts F from the FINGER processing sections $1_1$ to $1_n$ that a plurality of ones of the FINGER processing sections $1_1$ to $1_n$ receive with an equal delay amount, then it indicates to the path selection section 15 of only one of the FINGER processing sections 1 with an effective path signal G that its path is effective while it indicates to each of the path selection sections 15 of the remaining ones of the FINGER processing sections 1 with an effective path signal G that its path is ineffective. Consequently, those of the FINGER processing sections 1 to which it has been indicated that the path is ineffective do not perform reception processing for a reception correlation magnitude and consequently do not output any detection data C.

Where the CDMA receiving apparatus has such a construction as described above with reference to FIGS. 6 and 7, it is effective for such a delay profile as shown in FIG. 5. In particular, it is assumed that, where the delay amounts of de-spreading timings indicated to the correlators 82 of, for example, the FINGER processing sections $1_1$ and $1_2$ (the correlators to which the center values of the phases of the reception timings are provided) from the synchronization detection and phase tracking section 4 are represented by a and b, respectively, the reception delay amounts when the correction for the reception delay amounts is performed by the two FINGER processing sections $1_1$ and $1_2$ become a–d and b–d, respectively. In this instance, if the CDMA receiving apparatus has the construction described hereinabove with reference to FIG. 1(*a*), then when the delay amounts of the two FINGER processing sections $1_1$ and $1_2$ are equal to each other (a–d=b–d as seen in FIG. 5), the FINGER processing sections $1_1$ and $1_2$ receive signals of the same path, and consequently, the CDMA receiving apparatus cannot receive the signal accurately.

In contrast, where the CDMA receiving apparatus has such a construction described above with reference to FIGS. 6 and 7, one of the two FINGER processing sections $1_1$ and $1_2$ which receive with the delay amount b–d and the delay amount a–d, respectively, is disabled so that it cannot receive a signal. Consequently, the CDMA receiving apparatus can receive the signal accurately, and accurate reception and reception signal quality measurement can be maintained.

By preventing a plurality of FINGER processing sections from receiving a signal at a same reception timing in this manner, the signal can be received accurately, and consequently, otherwise possible deterioration of the reception signal quality can be prevented.

As described above, since each FINGER processing section includes a plurality of correlators having de-spread timings and one of the correlators which exhibits the highest correlation magnitude is selectively used for reception, even if the reception delay amount varies in a period shorter than the processing time of the synchronization detection and phase tracking sections 4, phase tracking can be performed. In particular, the problem of the conventional CDMA receiving apparatus that, if a displacement is produced between an instruction of a reception delay amount from a synchronization detection and phase tracking section 4 and a delay amount at which the correlation magnitude is maximum within a processing period of the synchronization detection and phase tracking section and varies the correlation magnitude level, the variation influences directly on the reception characteristic of the CDMA receiving apparatus can be eliminated.

Further, since it is prevented that a plurality of FINGER processing sections receive at the same timing, otherwise possible deterioration in reception signal quality can be prevented.

While preferred embodiments of the present invention have been described using specific terms, such description is for illustrative purposes only, and it is to be understood that changes and variations may be made without departing from the spirit or scope of the following claims.

What is claimed is:

1. A code division multiplex access (CDMA) receiving apparatus, comprising:

a plurality of reception processing sections individually including de-spreading sections for receiving a signal spread with a spread code and arriving through a plurality of paths as a reception signal and de-spreading the inputted reception signal with a de-spread code and channel estimation sections for estimating the paths based on results of the processing of said de-spreading sections; and a synchronization detection and phase tracking section for outputting reception delay amounts of the reception signal in a predetermined period to said de-spreading sections of said reception processing sections, each of said de-spreading sections including a plurality of correlators for individually correcting, when the reception delay amounts are received from said synchronization detection and phase tracking section, the reception delay amounts and performing de-spreading processing, each of said channel estimation sections including a plurality of level measurement sections for individually receiving a plurality of correlation magnitudes outputted from the corresponding plurality of correlators to measure levels of the correlation magnitudes, a level comparison section for comparing the measurement levels of said plurality of level measurement sections, a path change-over section for outputting the correlation magnitude of that one of the correlators which is detected to output the highest measurement level by said level comparison section as a reception signal from the path, a channel estimator for performing estimation of the path based on the correlation magnitude of the correlator selected by said path change-over section, and a detection section for correcting a symbol position of the reception signal based on the correlation magnitude selected by said path change-over section and an output of said channel estimator and outputting the corrected symbol position as detection data, wherein each of said plurality of correlators performs de-spreading with a phase fixed in relation to a delay amount indicated by said synchronization detection and phase tracking section, said phase being fixed differently from a phase used by any other one of said plurality of correlators.

2. A CDMA receiving apparatus as claimed in claim 1, wherein said plurality of correlators include a first correlator for performing de-spreading processing with the reception delay amount, a second correlator for performing de-spreading processing with a phase leading by a predetermined phase from the reception delay amount, and a third correlator for performing de-spreading processing with another phase lagging by the predetermined phase from the reception delay amount.

3. A code division multiplex access (CDMA) receiving apparatus, comprising:

a plurality of reception processing sections individually including de-spreading sections for receiving a signal spread with a spread code and arriving through a plurality of paths as a reception signal and de-spreading the inputted reception signal with a de-spread code and channel estimation sections for estimating the paths based on results of the processing of said de-spreading sections; and a synchronization detection and phase tracking section for outputting reception delay amounts of the reception signal in a predetermined period to said de-spreading sections of said reception processing sections, each of said de-spreading sections including a plurality of correlators for individually correcting, when the reception delay amounts are received from said synchronization detection and phase tracking section, the reception delay amounts and performing de-spreading processing, each of said channel estimation sections including a plurality of level measurement sections for individually receiving a plurality of correlation magnitudes outputted from the corresponding plurality of correlators to measure levels of the correlation magnitudes, a level comparison section for comparing the measurement levels of said plurality of level measurement sections, a path change-over section for outputting the correlation magnitude of that one of the correlators which is detected to output the highest measurement level by said level comparison section as a reception signal from the path, a channel estimator for performing estimation of the path based on the correlation magnitude of the correlator selected by said path change-over section, and a detection section for correcting a symbol position of the reception signal based on the correlation magnitude selected by said path change-over section and an output of said channel estimator and outputting the corrected symbol position as detection data, wherein said plurality of correlators include a first correlator for performing de-spreading with a phase of a delay amount indicated by said synchronization detection and phase tracking section and outputting a resulting correlation value, a second correlator for performing de-spreading with a phase leading, where 1 bit of a spread code is represented by 1 chip, by 0.5 chips from the delay amount indicated by said synchronization detection and phase tracking section and outputting a resulting correlation value, a third correlator for performing de-spreading with a phase lagging by 0.5 chips from the delay amount indicated by said synchronization detection and phase tracking section and outputting a resulting correlation value, a fourth correlator for performing de-spreading with a phase leading by 0.25 chips from the delay amount indicated by said synchronization detection and phase tracking section and outputting a resulting correlation value, and a fifth correlator for performing de-spreading with a phase lagging by 0.25 chips from the delay amount indicated by said synchronization detection and phase tracking section and outputting a resulting correlation value.

4. A CDMA receiving apparatus as claimed in claim 3, further comprising a delay amount comparison section for comparing the reception delay amounts of the correlators selected by the path change-over sections of said plurality of reception processing sections and allowing, when a plurality of ones of the reception processing sections exhibit an equal reception delay amount, only one of the reception processing sections to perform reception processing.

5. A CDMA receiving apparatus as claimed in claim 4, wherein each of said reception processing sections includes a path selection section for selectively setting an effective path when an effective path signal is received from said delay amount comparison section, and said delay amount comparison section indicates, if the delay amounts being received by said reception processing sections at present are different from one another, with effective path signals to said path selection sections of said reception processing sections that their paths are effective so that said reception processing sections may perform reception processing with the signal delay amounts, but indicates, if said delay amount comparison section detects as a result of the comparison of the reception delay amounts from said reception processing sections that a plurality of ones of said reception processing sections receive with an equal delay amount, to the path selection section of only one of said reception processing sections with an effective path signal that its path is effective while said delay amount comparison section indicates to each of the path selection sections of the remaining ones of said reception processing sections with an effective path signal that its path is ineffective.

6. A code division multiplex access (CDMA) receiving apparatus comprising:
a plurality of reception processing sections individually including de-spreading sections for receiving a signal spread with a spread code and arriving through a plurality of paths as a reception signal and de-spreading the inputted reception signal with a de-spread code and channel estimation sections for estimating the paths based on results of the processing of said de-spreading sections;
a synchronization detection and phase tracking section for outputting reception delay amounts of the reception signal in a predetermined period to said de-spreading sections of said reception processing sections,
each of said de-spreading sections including a plurality of correlators for individually correcting, when the reception delay amounts are received from said synchronization detection and phase tracking section, the reception delay amounts and performing de-spreading processing,
each of said channel estimation sections including a plurality of level measurement sections for individually receiving a plurality of correlation magnitudes outputted from the corresponding plurality of correlators to measure levels of the correlation magnitudes, a level comparison section for comparing the measurement levels of said plurality of level measurement sections, a path change-over section for outputting the correlation magnitude of that one of the correlators which is detected to output the highest measurement level by said level comparison section as a reception signal from the path, a channel estimator for performing estimation of the path based on the correlation magnitude of the correlator selected by said path change-over section, and a detection section for correcting a symbol position of the reception signal based on the correlation magnitude selected by said path change-over section and an output of said channel estimator and outputting the corrected symbol position as detection data; and
a delay amount comparison section for comparing the reception delay amounts of the correlators selected by the path change-over sections of said plurality of reception processing sections and allowing, when a plurality of ones of the reception processing sections exhibit an equal reception delay amount, only one of the reception processing sections to perform reception processing.

7. A CDMA receiving apparatus as claimed in claim 6, wherein each of said reception processing sections includes a path selection section for selectively setting an effective path when an effective path signal is received from said delay amount comparison section, and said delay amount comparison section indicates, if the delay amounts being received by said reception processing sections at present are different from one another, with effective path signals to said path selection sections of said reception processing sections that their paths are effective so that said reception processing sections may perform reception processing with the signal delay amounts, but indicates, if said delay amount comparison section detects as a result of the comparison of the reception delay amounts from said reception processing sections that a plurality of ones of said reception processing sections receive with an equal delay amount, to the path selection section of only one of said reception processing sections with an effective path signal that its path is effective while said delay amount comparison section indicates to each of the path selection sections of the remaining ones of said reception processing sections with an effective path signal that its path is ineffective.

8. A code division multiplex access (CDMA) receiving apparatus, comprising:
a plurality of reception processing sections individually including de-spreading sections for receiving a signal spread with a spread code and arriving through a plurality of paths as a reception signal and de-spreading the inputted reception signal with a de-spread code and channel estimation sections for estimating the paths based on results of the processing of said de-spreading sections;
a synchronization detection and phase tracking section for outputting reception delay amounts of the reception signal in a predetermined period to said de-spreading sections of said reception processing sections,
each of said de-spreading sections including a plurality of correlators for individually correcting, when the reception delay amounts are received from said synchronization detection and phase tracking section, the reception delay amounts and performing de-spreading processing,
each of said channel estimation sections including a plurality of level measurement sections for individually receiving a plurality of correlation magnitudes outputted from the corresponding plurality of correlators to measure levels of the correlation magnitudes, a level comparison section for comparing the measurement levels of said plurality of level measurement sections, a path change-over section for outputting the correlation magnitude of that one of the correlators which is detected to output the highest measurement level by said level comparison section as a reception signal from the path, a channel estimator for performing estimation of the path based on the correlation magnitude of the correlator selected by said path change-over section, and a detection section for correcting a symbol position of the reception signal based on the correlation magnitude selected by said path change-over section and an output of said channel estimator and outputting the corrected symbol position as detection data; and
a delay amount comparison section for comparing the reception delay amounts of the correlators selected by the path change-over sections of said plurality of reception processing sections and allowing, when a plurality of ones of the reception processing sections exhibit an equal reception delay amount, only one of the reception processing sections to perform reception processing.

9. A CDMA receiving apparatus as claimed in claim 8, wherein each of said reception processing sections includes a path selection section for selectively setting an effective path when an effective path signal is received from said delay amount comparison section, and said delay amount comparison section indicates, if the delay amounts being received by said reception processing sections at present are different from one another, with effective path signals to said path selection sections of said reception processing sections that their paths are effective so that said reception processing sections may perform reception processing with the signal delay amounts, but indicates, if said delay amount comparison section detects as a result of the comparison of the reception delay amounts from said reception processing sections that a plurality of ones of said reception processing sections receive with an equal delay amount, to the path selection section of only one of said reception processing sections with an effective path signal that its path is effective while said delay amount comparison section indicates to each of the path selection sections of the remaining ones of said reception processing sections with an effective path signal that its path is ineffective.

10. A code division multiplex access (CDMA) receiving apparatus, comprising:

a plurality of reception processing sections, each of said plurality of reception processing sections including de-spreading sections for receiving a signal spread with a spread code and arriving through a plurality of paths as a reception signal and channel estimation sections for estimating the paths based on results of the processing of said de-spreading sections; and a synchronization detection and phase tracking section for outputting reception delay amounts of the reception signal in a predetermined period to said de-spreading sections, wherein each of said de-spreading sections includes a plurality of correlators for individually correcting the reception delay amounts and performing de-spreading processing, and wherein each of said channel estimation sections includes a plurality of level measurement sections for individually receiving a plurality of correlation magnitudes outputted from the corresponding plurality of correlators to measure levels of the correlation magnitudes, wherein each of said plurality of correlators performs de-spreading with a phase fixed in relation to a delay amount indicated by said synchronization detection and phase tracking section, said phase being fixed differently from a phase used by any other one of said plurality of correlators.

11. The CDMA receiving apparatus as claimed in claim 10, wherein said channel estimation sections comprise a level comparison section for comparing the measurement levels of said plurality of level measurement sections.

12. The CDMA receiving apparatus as claimed in claim 11, wherein said channel estimation sections further comprise a path change-over section for outputting the correlation magnitude of that one of the correlators which is detected to output the highest measurement level by said level comparison section as a reception signal from the path.

13. The CDMA receiving apparatus as claimed in claim 12, wherein said channel estimation sections further comprise a channel estimator for performing estimation of the path based on the correlation magnitude of the correlator selected by said path change-over section.

14. The CDMA receiving apparatus as claimed in claim 13, wherein said channel estimation sections further comprise a detection section for correcting a symbol position of the reception signal based on the correlation magnitude selected by said path change-over section and an output of said channel estimator and outputting the corrected symbol position as detection data.

15. A code division multiplex access (CDMA) receiving apparatus, comprising:

means for reception processing including de-spreading means for receiving a signal spread with a spread code and arriving through a plurality of paths as a reception signal and de-spreading the inputted reception signal with a de-spread code, and channel estimation means for estimating the paths based on results of the processing of said de-spreading means; and means for synchronization detection and phase tracking for outputting reception delay amounts of the reception signal in a predetermined period to said de-spreading means of said reception processing means, wherein said de-spreading means comprise a plurality of correlators for individually correcting, when the reception delay amounts are received from said synchronization detection and phase tracking means, the reception delay amounts and performing de-spreading processing, and wherein said channel estimation means comprises a plurality of level measurement sections for individually receiving a plurality of correlation magnitudes outputted from the corresponding plurality of correlators to measure levels of the correlation magnitudes, wherein each of said plurality of correlators performs de-spreading with a phase fixed in relation to a delay amount indicated by said synchronization detection and phase tracking means, said phase being fixed differently from a phase used by any other one of said plurality of correlators.

16. The CDMA receiving apparatus as claimed in claim 15, wherein said channel estimation means further comprises a level comparison section for comparing the measurement levels of said plurality of level measurement sections.

17. The CDMA receiving apparatus as claimed in claim 16, wherein said channel estimation means further comprises a path change-over section for outputting the correlation magnitude of that one of the correlators which is detected to output the highest measurement level by said level comparison section as a reception signal from the path.

18. The CDMA receiving apparatus as claimed in claim 17, wherein said channel estimation means further comprises a channel estimator for performing estimation of the path based on the correlation magnitude of the correlator selected by said path change-over section.

19. The CDMA receiving apparatus as claimed in claim 18, wherein said channel estimation means further comprises a detection section for correcting a symbol position of the reception signal based on the correlation magnitude selected by said path change-over section and an output of said channel estimator and outputting the corrected symbol position as detection data.

\* \* \* \* \*